Patented Apr. 21, 1953

2,636,038

UNITED STATES PATENT OFFICE 2,636,038

SURFACE ACTIVE AGENTS

John David Brandner, Wilmington, Del., assignor to Atlas Powder Company, Wilmington, Del., a corporation of Delaware No Drawing. Application May 18, 1951, Serial No. 227,107

4 Claims. (Cl. 260—307)

This invention relates to surface active organic compounds and more particularly to such compounds containing an oxazoline nucleus.

It is the object of the invention to provide novel compounds which are polyoxyalkylene ethers of hydroxy alkyl oxazoline compounds containing long chain hydrocarbon radicals. The compounds of the invention may be expressed by the generic formula

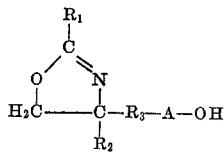

wherein $R_1$ is an aliphatic hydrocarbon radical of from 7 to 17 carbon atoms, $R_2$ is hydrogen or methyl, $R_3$ is a short chain alkylene radical, and A represents a polyoxyalkylene radical containing from 2 to 20 oxyalkylene groups selected from the class consisting of oxyethylene, oxypropylene and mixtures of oxyethylene and oxypropylene groups.

The compounds are thus hydroxy polyoxyalkylene ethers of 4-hydroxyalkyl oxazolines substituted in the 2-position by a long chain aliphatic hydrocarbon radical, and, optionally in the 4-position by methyl. Among such substituted oxazolines may be named: 2 - heptadecyl - 4 - methyl - 4 - hydroxymethyl - 2 - oxazoline; 2 - heptadecenyl - 4 - methyl - 4 - hydroxy - methyl - 2 - oxazoline; 2 - hendecyl - 4 - hydroxyethyl - 2 - oxazoline; and 2 - heptyl - 4 - methyl - 4 - hydroxymethyl - 2 - oxazoline. Mixtures of oxazolines in which the substituted long chain hydrocarbon radical corresponds to the hydrocarbon radical of the fatty acids of naturally occurring fats and oils or of the mixture of resin acids and fatty acids known as tall oil are the full equivalent of the compounds above named.

The hydroxy polyoxyalkylene ethers of the above named oxazolines may be prepared in any suitable manner. For example, fatty acids supplying the radical $R_1$, may be condensed in equimolar proportions with hydroxy polyoxyalkylene ethers of amino alcohols having the formula:

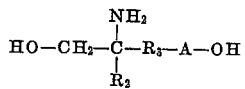

with the removal of two molar proportions of water, the said condensation taking place, for example, in the temperature range of 150° C. to 240° C.

Preferably, however, the compounds of the invention are prepared by the addition reaction between alkylene oxides and substituted oxazolines of the group named hereinbefore. The addition reaction is advantageously carried out at elevated temperature and pressure, and in the presence of an alkaline catalyst. The following examples illustrate the preparation of various polyoxyalkylene ethers of the invention.

Example I

Introduce 800 grams of 2-heptadecenyl-4-methyl - 4 - hydroxymethyl - 2 - oxazoline and 5 grams of sodium methylate into an autoclave provided with a stirrer and a coil for circulating heat exchange fluid therein. Flush the autoclave with ethylene oxide gas and close. Heat the charge to 140° C. and add, in increments, 221 grams of ethylene oxide; controlling the rate of addition and the rate of heat exchange to maintain the temperature at 140° C. and the pressure between 30 and 50 pounds per square inch. After all of the ethylene oxide has been added continue the reaction at 140° C. until the ethylene oxide is consumed as is indicated by the decrease of pressure to substantially atmospheric. The resulting product is a clear, high-boiling liquid containing approximately 2 oxyethylene groups per oxazoline residue. It is slightly soluble in mineral oil and is an excellent inhibitor of corrosion by moisture in the presence of oil.

Example II

The process of Example I is carried out with the following charge weights:

1050 grams 2-heptadecenyl-4-methyl-4-hydroxy methyl-2-oxazoline
10 grams sodium methylate
817 grams ethylene oxide The resulting compound contains approximately 6 oxyethylene groups per oxazoline radical and is a surface active agent, readily dispersible in water.

Example III

In order to obtain a product which disperses in water to form clear, transparent systems the following reactants are treated by the process of Example I.

800 grams 2-heptadecenyl-4-methyl-4-hydroxy methyl-2-oxazoline
11 grams sodium methylate
1434 grams ethylene oxide The proportions correspond to about 14 oxyethylene groups per oxazoline radical and the product is a good dispersing agent.

Example IV

An oxyethylated derivative which is a good detergent and is on the border line between forming clear and cloudy dispersions in water contains approximately 10 oxyethylene groups per oxazoline radical. Such a compound may be prepared by reacting the following ingredients by the method of Example I:

700 grams 2-heptadecenyl-4-methyl-4-hydromethyl-2-oxazoline
8 grams sodium methylate
920 grams ethylene oxide

Example V

Heat 1050 grams of 2-heptadecenyl-4-methyl-4-hydromethyl-2-oxazoline and 14 grams of sodium methylate to 140° C. in an autoclave and flush the gas space with a small amount of propylene oxide. Close the autoclave and introduce, in increments 1665 grams of propylene oxide, controlling the rate of addition and the heat exchange of the charge so that the temperature remains at about 140° C. and the pressure between 30 and 50 pounds per square inch until all of the propylene oxide has been added. Continue the reaction at 140° C. until the entire quantity of propylene oxide has been consumed as indicated by a drop in pressure to substantially atmospheric. The product contains approximately 10 oxypropylene groups per oxazoline residue.

Example VI

A heteropolyoxyalkylene ether of a substituted oxazoline may be prepared by reacting the following ingredients according to the procedure of Example V.

800 grams 2-heptadecenyl-4-methyl-4-hydromethyl-2-oxazoline
10 grams sodium methylate
1400 grams equimolar mixture of ethylene oxide and propylene oxide The product contains approximately 12 oxyalkylene groups per oxazoline residue, the said groups comprising equal numbers of oxyethylene and oxypropylene groups randomly distributed throughout the hetero-compound.

The compounds of the invention are detergents, wetting agents, penetrants, emulsifying agents, and corrosion inhibitors.

What is claimed is:

1. A compound conforming to the structural formula:

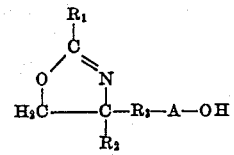

wherein $R_1$ is an aliphatic hydrocarbon radical of from 7 to 17 carbon atoms, $R_2$ is selected from the group consisting of hydrogen and methyl, $R_3$ is an alkylene radical containing not more than 2 carbon atoms, and A is a polyoxyalkylene radical containing from 2 to 20 oxyalkylene groups selected from the class consisting of oxyethylene radicals, oxypropylene radical, and mixtures of oxyethylene and oxypropylene radicals.

2. A hydroxy polyoxyethylene ether of 2-heptadecenyl - 4 - methyl - 4 - hydroxymethyl - 2 - oxazoline containing from 2 to 20 oxyethylene groups per oxazoline residue.

3. The hydroxy dioxyethylene ether of 2-heptadecenyl - 4 - methyl - 4 - hydroxymethyl - 2 - oxazoline.

4. The hydroxy decaoxyethylene ether of 2-heptadecenyl - 4 - methyl - 4 - hydroxymethyl - 2-oxazoline.

JOHN DAVID BRANDNER.

References Cited in the file of this patent

UNITED STATES PATENTS

| Number | Name | Date |
|---|---|---|
| 2,410,318 | Tryon | Oct. 29, 1946 |
| 2,443,825 | Johnson | June 22, 1948 |